Sept. 21, 1954 E. N. CASTLE Re. 23,871
FOLDABLE CARDBOARD BOTTLE CARRIER
Original Filed Jan. 10, 1950
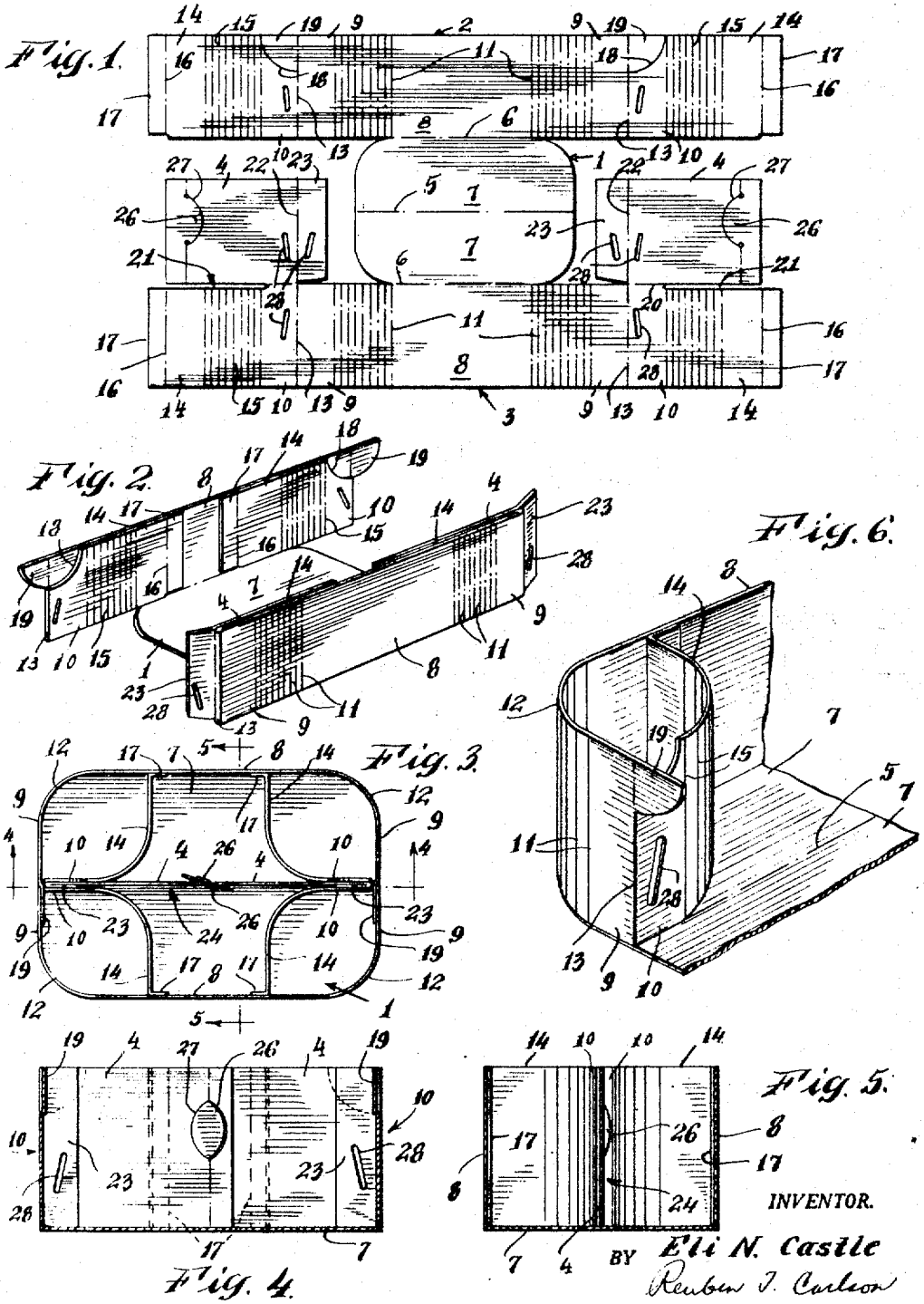
INVENTOR.
BY Eli N. Castle
Reuben J. Carlson
ATTORNEY.

Reissued Sept. 21, 1954

Re. 23,871

UNITED STATES PATENT OFFICE 23,871

FOLDABLE CARDBOARD BOTTLE CARRIER

Eli N. Castle, South Orange, N. J., assignor to The Gardner Board and Carton Co., Middletown, Ohio, a corporation of Ohio Original No. 2,586,301, dated February 19, 1952, Serial No. 137,813, January 10, 1950. Application for reissue November 28, 1952, Serial No. 323,173

16 Claims. (Cl. 220—115)

Matter enclosed in heavy brackets [ ] appears in the original patent but forms no part of this reissue specification; matter printed in italics indicates the additions made by reissue.

This invention relates to a bottle carrier and it is one object of the invention to provide a carrier which is formed from a single blank or cardboard, or other suitable sheet material, and is of such construction that the blank may be folded [and] *to* form a carrier divided into bottle receiving pockets by partitions extending longitudinally and transversely of the carrier.

Another object of the invention is to provide a carrier wherein the longitudinally extending partition is formed of sections which are [detachably] connected with each other and thus held in position for forming the longitudinal partition and also holding end [walls] *wall* forming [portions] *sections* of the blank in place across ends of the bottom *wall* of the carrier.

Another object of the invention is to provide a carrier having a bottom *wall* which is foldable transversely along a longitudinally extending fold line, the carrier also having end [walls] *wall sections* and transverse partitions which are [flexible] *foldable* so that [when end sections of the longitudinal partition are released from each other,] the carrier may be collapsed to a flattened condition in which its side walls, *cross partitions and longitudinal partition* are disposed in close face to face relation to each other.

Another object is to so form the carrier that [while] it may be disposed in either a folded or extended position. [it will be firmly held in the extended position and its parts prevented from moving out of proper relation to each other.]

With these and other objects in view, the invention consists of an improved construction and arrangement of parts, one practical embodiment of the invention being illustrated in the accompanying drawings wherein:

Figure 1 is a view looking down upon the blank from which the improved bottle carrier is formed;

Figure 2 is a perspective view of the carrier when partially formed;

Figure 3 is a top plan view of the *erected* carrier;

Figure 4 is a sectional view, taken longitudinally through the carrier along line 4—4 of Figure 3;

Figure 5 is a transverse sectional view, taken along line 5—5 of Figure 3; and

Figure 6 is a view showing a corner portion of the carrier in perspective with portions in section.

This improved bottle carrier is formed from the blank shown in Figure 1, and referring to this figure, it will be seen that the blank has a center portion 1 and side strips 2 and 3 [,the]. *The* side strips [having end portions] 2 *and 3 provide the side walls 8 of the carrier and have end extensions* free from and projecting beyond *the* ends of the center portion 1 [and the]. *The* strip 3 [having extensions 4 disposed along their inner sides] *has flaps 4 captured from sheet material between adjacent end extensions* and spaced from *the* ends of the center section 1. The *bottom wall forming* center section is creased longitudinally midway its width [to form a] *by a bottom collapsing* fold line 5 [and along opposite side edges of the center section are fold lines 6. The center section 1 forms the bottom] *which defines the bottom half sections 7* of the carrier [and the side strips 2 and 3 are foldable upwardly along the lines 6 to form side walls 8 which]. *The side wall sections 8 of the strips 2 and 3* are attached to the bottom *half sections 7 by fold lines 6* along opposite sides thereof.

[After the] *The* side strips [have been bent] *2 and 3 fold* upwardly to form the side walls 8 [,] *and* the free end [portions] *extensions* of the strips [are folded] *fold* inwardly towards each other to form *the end wall* sections 9 [of end walls 10] of the carrier. [and inner ends of] *The* [the] free end [portions] *extensions* of the strips [are each] *may each be* formed with a plurality of transversely spaced parallel creases 11 so that the end [walls] *wall sections 9* will be connected with the side walls *8* by arcuate corner portions 12 which follow the curvature of the rounded corners of the bottom *wall sections 7*.

[After forming] *From* the end [walls] *wall sections 9*, the ends of the strips [are bent] *fold* inwardly along the fold lines 13 to form inwardly extending *longitudinal partition* portions [which form] *10 and* transverse partitions 14 for the carrier. [These partitions are each formed with a plurality of] *Each longitudinal partition portion 10 may be joined to the transverse partition 14 by one or more* transversely spaced creases 15 so that [their inner end portions] *the paired longitudinal partition portions 10* may be disposed parallel and in close face to face relation to each other and the companion *transverse* partitions *14* then [curved] *folded* away from each other [and] *to* extend transversely of the carrier towards the side walls 8. [Outer] *The outer* ends of the transverse partitions *14* are bent along fold lines 16 to form [lips] *flaps* 17 and these [lips] *flaps* are glued or otherwise secured against *the* inner faces of the side walls *8*. Since the [partitions] *partition portions 10 and 14* are creased [to form the] *by the fold* lines [15] *13, 15 and 16*, they may be moved from an extended position to a folded position in which they extend longitudinally of the carrier and [are disposed flat against the corner forming portions of the side strips] *in parallel relation to the side walls 8.* The partition forming [portions] *extensions* of the side strip 2 [are] *may be* cut along arcuate lines 18 to form tongues 19 [and these tongues are] *which may be* glued or otherwise [securely] fastened against inner faces of the end wall forming [portions] *sections 9* of the strip 3 so that the two end wall sections 9 will be firmly held in meeting relation to each other.

[Before the end portions] *The end extensions* of the side strips *2 and 3* are bent to form the end wall sections 9, *the longitudinal partition portions 10* and the transverse partitions 14, *and the flaps 4 are folded upwardly to complete the longitudinal partition 24 of the carrier. Each of* the flaps 4 of the strip 3 are [bent along the fold lines 20 which extend between inner ends of the flaps and inner ends of slits 21 extending from outer ends of panels 4 to the inner ones of the transversely extending creases 15, and when] *connected by a fold line 20 to the adjacent longitudinal partition portion 10 of the strip 3 but is otherwise separated from the adjacent transverse partition 14 by a slit 21. When* these flaps *4* are bent *upwardly* along the fold lines *20,* they will be disposed longitudinally of the carrier [and] *to provide additional longitudinal partition parts and will* have their outer end portions disposed between the parallel [end portions of the transverse partitions.] *longitudinal partition portions 10 with which they are associated.* The [inner parallel end] *paired longitudinal partition* portions [of the transverse partitions] are glued [against] *to* opposite side faces of the outer ends of the [flaps, and it should be noted that] *adjacent longitudinal partition parts 4. The* [inner] *outer* ends of the *longitudinal partition forming* flaps [are] *4 may be* bent along fold lines 22 to form lips or tongues 23 which are disposed flat against side faces of the flaps [and] *to* serve as reinforcements for ends of [a] *the* longitudinal partition 24 [which has end sections 25] *as* formed by the two flaps 4 [.] *and the paired longitudinal partition portions 10.*

Tongues 26 [are] *may be* cut from the flaps [to provide the free inner ends of the partition sections 25.] *4 to connect them.* The tongues of the two partition [sections] *parts 4* extend in directions opposite to each other and when the partition [sections 25] *parts 4* are grasped by their free inner ends, the tongues may be passed through openings 27 formed by the tongues and the tongues then disposed in overlapping and interlocked engagement with each other [and thus cause the two sections 25 to form a] *to complete the longitudinal* partition extending the full length of the carrier. When the tongues are released from each other, the bottom *half sections* 7 may be folded along the line 5 and the transverse partitions *14* will be flattened and the side walls *8* moved to a position in close proximity to each other. *The carrier may also be collapsed, when the parts 4 of the longitudinal partition 24 remain permanently connected, by shifting the longitudinal partition 24 endwise of the carrier, whereupon the bottom half sections 7 will fold along the bottom collapsing fold 5, the transverse partitions 14 will be flattened and the side walls 8 will be moved to a position in close proximity to each other.* The carrier [will] *can* thus be folded and collapsed to a flat mass and a number of the collapsed carriers stacked upon a shelf in a store or wrapped for shipment by a manufacturer. [The slots 28 register and] *Slots 28 which fall into registry may be cut in the flaps 4, lips 23 and longitudinal partition portions 10 to thereby* form openings through which portions of a handle may be engaged and thus allow the carrier to be lifted and conveniently carried from one place to another.

From the foregoing description of the construction of my improved [device] *carrier* the operation thereof and the method of assembly will be readily understood, and it will be seen that I have provided a comparatively simple, inexpensive and efficient means for carrying out the various objects of the invention.

Having thus described the invention, what is claimed is:

1. A carrier comprising a bottom, side walls united with opposite side edges of said bottom and having end portions free from the bottom and extending longitudinally therefrom and bent towards each other across ends of the bottom and meeting midway the width of the bottom and forming end walls of the carrier, the said free portions of the walls being bent inwardly at their intersection with each other and forming partitions bent transversely of the bottom and secured at their ends to inner faces of the side walls, the said partitions having tongues cut therefrom and secured against portions forming the end walls, and the partition-forming portions at one side having extensions along their inner sides partially severed therefrom and bent upwardly and forming end portions of a longitudinal partition, the said side extensions having outer ends secured between ends of the transverse partitions and having inner ends cut to form tongues detachably engageable with each other to releasably secure the said side extensions in overlapped partition-forming engagement with each other, and said bottom being foldable transversely along a fold line midway its width to reduce the carrier to a folded position disposing the transverse partitions and the rear wall forming partitions longitudinally of the carrier and in engagement with each other.

2. A collapsible carrier formed from a unitary blank of sheet material having a central portion forming a bottom for the carrier, strips extending longitudinally of the bottom and integrally united therewith along opposite sides thereof and having free end portions extending beyond ends of the bottom, said strips being bent upwardly along opposite sides of the bottom and forming side walls of the carrier and having their free end portions bent towards each other and forming end walls of the carrier and then bent inwardly and forming extensions secured to the side walls and forming transverse partitions, the end wall forming portions of one strip having tongues cut from them and secured against inner faces of the end wall forming portions of the other strip, one strip having its end wall forming portions formed with transverse extensions extending along their inner sides and partially severed therefrom and constituting flaps bent upwardly and secured between attached ends of the transverse portions and forming end sections of a longitudinal partition having inner ends cut to form tongues detachably connected in overlapping engagement with each other and holding the longitudinal partition in place and thereby maintaining the end wall portions in place across ends of the bottom.

3. A carrier formed of sheet material and comprising a bottom, side walls extending upwardly along opposite side edges of said bottom and having free end portions folded towards each other and secured and forming end walls for the carrier and then bent inwardly against each other and having portions bent towards the side walls and secured at their outer ends to the side walls and forming transverse partitions in the carrier, flaps along side edges of the partition forming portions of one side wall partially severed therefrom and bent upwardly and secured between the said partition-forming portions and having free inner end portions and carrying tongues interlocked and detachably holding the flaps in engagement with each other and thereby forming a longitudinal partition in the carrier, and said bottom having a longitudinal fold line midway its width adapting the carrier to be flattened when the flaps are released from each other.

4. A carrier comprising a bottom, side walls projecting upwardly along sides of said bottom, end walls formed of sections free from the bottom and extending towards each other from ends of said side walls and integral therewith, and having extensions bent inwardly and extending into end portions of the carrier and secured at their ends to the side walls and forming transverse partitions in the carrier, the extension forming one end wall portion at each end of the carrier being provided with a tongue secured to the companion end wall portion and securing the companion end wall portions to each other, and flaps integral with but partially severed from one extension at each end of the carrier and disposed longitudinally of the carrier between companion extensions, said flaps having inner ends detachably connected with each other and thereby forming a longitudinal partition in the carrier.

5. A carrier comprising a bottom, side walls projecting upwardly along sides of said bottom, end walls formed of sections extending towards each other from ends of said side walls and integral therewith, and having extensions extending into end portions of the carrier and toward the side walls secured at their ends to the side walls and forming transverse partitions in the carrier, the extension forming one end wall portion at each end of the carrier being provided with a tongue secured to the companion end wall portion and securing the companion end wall portions to each other, and flaps integral with but partially severed from one extension at each end of the carrier and disposed longitudinally of the carrier between companion extensions and having outer end portions folded inwardly and forming reinforcing strips, said flaps having inner end portions formed with tongues interlocked with each other and releasably holding the flaps in engagement with each other and thereby forming a longitudinal partition in the carrier, and said strips and portions of the extensions at opposite sides thereof being formed with handle-receiving openings.

*6. A one-piece bottle carrier blank formed from sheet material including a bottom wall, a pair of side walls foldably connected to the opposite side edges of said bottom wall, a pair of adjacent spaced end extensions projecting from both ends of said side walls, each of said end extensions including an end wall section foldably connected to the adjacent end of the adjacent side wall, a longitudinal partition portion foldably connected to the end wall section and a cross partition foldably connected to the longitudinal partition section, and a pair of longitudinal partition parts each extending into the area between the longitudinal partition portions and cross partitions of the adjacent pair of spaced end extensions and having a width substantially greater than one-half of the width of said bottom wall, each of said longitudinal partition parts being integrally hinged by a bottom margin forming fold to the longitudinal partition portion of one of said paired end extensions but otherwise separated from the adjacent end extensions and said bottom wall.*

*7. A bottle carrier body formed from a single blank of sheet material including, a bottom wall, a pair of side walls foldably connected to the opposite side edges of the bottom wall, a pair of end wall sections at each end of the carrier foldably connected to the adjacent ends of said side walls and extending transversely of the carrier to a position adjacent the longitudinal mid-section of said bottom wall, a pair of adjacent longitudinal partition portions foldably connected to one pair of adjacent end wall sections and extending inwardly and longitudinally of the carrier, and an upwardly projecting longitudinal partition part having a height substantially greater than one-half of the width of said bottom wall, said partition part being foldably connected at the lower end thereof to one of said paired partition portions and extending substantially in parallelism with said paired partition portions longitudinally of the carrier body along the approximate mid-section of said bottom wall and providing with said partition portions a center partition section for the carrier body.*

*8. A bottle carrier body formed from a single blank of sheet material including, a bottom wall, a pair of side walls foldably connected to the opposite side edges of the bottom wall, a pair of end wall sections at each end of the carrier foldably connected to the adjacent ends of said side walls and extending transversely of the carrier to to position adjacent the longitudinal mid-section of said bottom wall, a pair of adjacent longitudinal partition portions foldably connected to a pair of said adjacent end wall sections and extending inwardly and longitudinally of the carrier, an upwardly projecting longitudinal partition part having a height substantially greater than one-half of the width of said bottom wall, said partition part being foldably connected at the lower end thereof to one of said paired partition portions and extending substantially in parallelism with said paired partition portions longitudinally of the carrier body along the approximate mid-section of said bottom wall and providing with said partition portions a center partition section for the carrier body, and a transverse partition foldably connected to each of said side walls and to said center partition section.*

*9. A bottle carrier body formed from a single blank of sheet material including, a bottom wall, a pair of side walls foldably connected to the opposite side edges of the bottom wall, a pair of end wall sections at each end of the carrier foldably connected to the adjacent ends of said side walls and extending transversely of the carrier to a position adjacent the longitudinal mid-section of said bottom wall, a pair of adjacent longitudinal partition portions foldably connected to each pair of end wall sections and extending inwardly and longitudinally of the carrier, a transverse partition foldably connected to each of said longitudinal partition portions, and a securing portion foldably connected to each transverse partition and attached to the inside face of the adjacent side wall, and an upwardly projecting partition part having a height substantially greater than* one-half of the width of said bottom wall and integrally connected at the lower end thereof to one of said paired partition portions, said partition part having a section thereof positioned between its associated pair of longitudinal partition portions and a section thereof extending longitudinally of the carrier body along the approximate mid-section of said bottom wall for a substantial distance beyond the adjacent transverse partitions.

10. A bottle carrier body formed from a single blank of sheet material including a bottom wall, a pair of side walls foldably connected to the opposite side edges of the bottom wall, a pair of end wall sections at each end of the carrier foldably connected to the adjacent ends of said side walls and extending transversely of the carrier to a position adjacent the longitudinal mid-section of said bottom wall, a pair of adjacent longitudinal partition portions foldably connected to each pair of end wall sections and extending inwardly and longitudinally of the carrier, and an upwardly projecting longitudinal partition part associated with each pair of longitudinal partition portions and integrally hinged at the lower end thereof by a bottom margin forming fold to one of its associated longitudinal partition portions, each of said longitudinal partition parts having a height substantially greater than one-half the width of said bottom wall with a section thereof overlapping the paired longitudinal partition portions with which it is associated and a section thereof extending longitudinally of the carrier for a substantial distance beyond its associated longitudinal partition portions, the extended sections of said paired longitudinal partition parts being arranged in overlapping relationship as the carrier is assembled.

11. A bottle carrier body formed from a single blank of sheet material including, a bottom wall, a pair of side walls foldably connected to the opposite side edges of the bottom wall, a pair of end wall sections at each end of the carrier foldably connected to the adjacent ends of said side walls and extending transversely of the carrier to a position adjacent the longitudinal mid-section of said bottom wall, a pair of longitudinal partition portions foldably connected to each pair of end wall sections and extending inwardly over the approximate mid-section of said bottom wall, a transverse partition foldably connected to each of said longitudinal partition portions, and an attaching portion foldably connected to each transverse partition and secured to the inside face of the adjacent side wall, and an upwardly projecting longitudinal partition part associated with each pair of longitudinal partition portions and integrally hinged by a bottom margin forming fold to one of its associated longitudinal partition portions, each of said longitudinal partition parts having a section thereof positioned between the paired longitudinal partition portions with which it is associated and a projecting section extending longitudinally of the carrier for a substantial distance beyond its associated longitudinal partition portions and the adjacent cross partitions, the projecting sections of said longitudinal partition portions being arranged in overlapping relationship as the carrier is assembled.

12. A carrier blank formed of sheet material including, a bottom wall, a pair of side walls foldably connected to the opposite side edges of said bottom wall, pair of spaced end extensions projecting from adjacent ends of said side walls, each of said end extensions including an end wall section foldably connected to the end of the adjacent side wall and a longitudinal partition portion foldably connected to the end wall section, and a one-piece longitudinal center partition part separated from said bottom wall and extending into the area between said spaced end extensions and having a width substantially greater than one-half of the width of said bottom wall, said longitudinal center partition part being integrally hinged by a bottom margin forming fold to the longitudinal partition portion of one of said paired end extensions but otherwise separated from said end extension, said other end extension presenting a free lower edge for the full length thereof which is separated from said center partition part and which does not extend appreciably into the plane as defined by a straight line continuation of the adjacent side edge of said bottom wall, said longitudinal center partition part being foldable about said bottom margin forming fold into overlying relation to the longitudinal partition portion to which it is integrally hinged.

13. A one-piece bottle carrier blank formed of sheet material including, a bottom wall, a pair of side walls foldably connected to the opposite side edges of said bottom wall, a pair of spaced end extensions projecting from adjacent ends of said side walls, each of said end extensions including an end wall section foldably connected to the end of the adjacent side wall, a longitudinal partition portion foldably connected to the end wall section and a cross partition foldably connected to the longitudinal partition portion, and a one-piece longitudinal center partition part separated from said bottom wall and extending into the area between the longitudinal partition portions and associated cross partitions of said spaced end extensions and having a width substantially greater than one-half of the width of said bottom wall, said longitudinal center partition part being integrally hinged by a bottom margin forming fold to the longitudinal partition portion of one of said paired end extensions but otherwise separated from said end extension, said other end extension presenting a free lower edge for the full length thereof which is separated from said center partition part and which does not extend appreciably into the plane as defined by a straight line continuation of the adjacent side edge of said bottom wall, said longitudinal center partition part being foldable about said bottom margin forming fold into overlying relation to the longitudinal partition portion to which it is integrally hinged.

14. A one-piece bottle carrier blank formed of sheet material including, a bottom wall, a pair of side walls foldably connected to the opposite side edges of said bottom wall, a pair of spaced end extensions projecting from adjacent ends of said side walls, each of said end extensions including an end wall section foldably connected to the end of the adjacent side wall, a longitudinal partition portion foldably connected to the end wall section, a cross partition foldably connected to the longitudinal partition portion, and a side wall securing portion foldably connected to the cross partition, and a one-piece longitudinal center partition part separated from said bottom wall and extending into the area between the longitudinal partition portions and cross partitions of said spaced end extensions and having a width substantially greater than one-half of the width of said bottom wall, said longitudinal center partition part being integrally hinged by a bottom margin forming fold

*to the longitudinal partition portion of one of said paired end extensions, but otherwise separated from said end extension, said other end extension presenting a free lower edge for the full length thereof which is separated from said center partition part and which does not extend appreciably into the plane as defined by a straight line continuation of the adjacent side edge of said bottom wall, said longitudinal center partition part being foldable about said bottom margin forming fold into overlying relation to the longitudinal partition portion to which it is integrally hinged.*

*15. A one-piece bottle carrier blank formed from sheet material including, a bottom wall, a pair of side walls foldably connected to the opposite side edges of said bottom wall, a pair of spaced end extensions projecting from both ends of said side walls, each of said end extensions including an end wall section foldably connected to the end of the adjacent side wall and a longitudinal partition portion foldably connected to the end wall section, and a pair of longitudinal center partition parts each separated from said bottom wall and extending into the area between the adjacent spaced pair of end extensions and having a width substantially greater than one-half of the width of said bottom wall, each of said longitudinal center partition parts being integrally hinged by a bottom margin forming fold to the longitudinal partition portion of one of said paired end extensions but otherwise separated from said end extension, said other adjacent end extension presenting a free lower edge for the full length thereof which is separated from said center partition part and which does not extend appreciably into the plane as defined by a straight line continuation of the adjacent side edge of said bottom wall, each of said longitudinal center partition parts being foldable about said bottom margin forming fold into overlying relation to the longitudinal partition portion to which it is integrally hinged.*

*16. A one-piece bottle carrier blank formed of sheet material including, a bottom wall, a pair of side walls foldably connected to the opposite side edges of said bottom wall, a pair of spaced end extensions projecting from adjacent ends of said side walls, each of said end extensions including an end wall section foldably connected to the end of the adjacent side wall, a longitudinal partition portion foldably connected to the end wall section and a cross partition foldably connected to the longitudinal partition portion, and a one-piece longitudinal partition part separated from said bottom wall and extending into the area between the longitudinal partition portions and associated cross partitions of said spaced end extensions and having a width substantially greater than one-half of the width of said bottom wall, said longitudinal partition part being integrally hinged by a bottom margin forming fold to the longitudinal partition portion of one of said paired end extensions but otherwise separated from said end extension, said longitudinal partition part being foldable about said bottom margin forming fold into overlying contacting relation to the longitudinal partition portion to which it is integrally hinged.*

References Cited in the file of this patent or the original patent

UNITED STATES PATENTS

| Number | Name | Date |
|---|---|---|
| 681,685 | Dominguez | Sept. 3, 1901 |
| 1,157,712 | Miller | Oct. 26, 1915 |
| 2,097,941 | Wells | Nov. 2, 1937 |
| 2,285,399 | Arneson | June 9, 1942 |
| 2,300,874 | De Ferrari | Nov. 3, 1942 |
| 2,345,746 | Goodyear | Apr. 4, 1944 |